(12) United States Patent
Broussard

(10) Patent No.: US 8,044,931 B2
(45) Date of Patent: *Oct. 25, 2011

(54) TECHNIQUE FOR DETERMINING A MINIMUM SIZE OF PRESENTATION DATA

(75) Inventor: Scott J. Broussard, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/181,977

(22) Filed: Jul. 29, 2008

(65) Prior Publication Data

US 2009/0015598 A1    Jan. 15, 2009

Related U.S. Application Data

(63) Continuation of application No. 10/042,045, filed on Jan. 8, 2002, now Pat. No. 7,417,619.

(51) Int. Cl.
*G09G 5/00* (2006.01)
(52) U.S. Cl. .................. 345/156; 345/472.1; 345/698
(58) Field of Classification Search .............. 345/87–89, 345/156–162, 467–473, 690–699
See application file for complete search history.

(56) References Cited

U.S. PATENT DOCUMENTS

| 5,721,565 A | * | 2/1998 | Nguyen ..................... 345/660 |
| 5,815,160 A | * | 9/1998 | Kikuchi et al. ............. 345/661 |
| 6,072,443 A | * | 6/2000 | Nasserbakht et al. ......... 345/7 |
| 6,592,223 B1 | * | 7/2003 | Stern et al. ................. 351/239 |
| 7,417,619 B2 | * | 8/2008 | Broussard ................... 345/156 |

OTHER PUBLICATIONS

Nazir et al, "Letter legibility and Visual word recognition", Memory and Cognition, Jul. 1998, 26(4), pp. 810-821.*

* cited by examiner

*Primary Examiner* — Vijay Shankar
(74) *Attorney, Agent, or Firm* — Dillon & Yudell LLP

(57) ABSTRACT

A presentation authoring tool is used to create presentation data for later projection, to determine a recommended font size for the created presentation data displayed on a display screen of a computer executing the presentation authoring tool. The user interface presents a display screen for receiving input of an expected viewing distance for the later projection of the presentation. The recommended font is determined based upon the expected viewing distance of the later projection having a projected font size viewable by a person, having a certain vision capability, at the expected viewing distance. The expected viewing distance may be a maximum viewing distance or a room depth of a room in which the later projection takes place.

20 Claims, 5 Drawing Sheets

TECHNIQUE FOR DETERMINING A MINIMUM SIZE OF PRESENTATION DATA

CROSS REFERENCE TO RELATED APPLICATION

This application is a continuation of U.S. patent application Ser. No. 10/042,045, filed Jan. 8, 2002, the contents of which are hereby incorporated herein by reference for all purposes.

BACKGROUND OF THE INVENTION

1. Field of the Invention

This invention relates to computer-related presentation tools, and more specifically, to a system, method and program for determining a minimum desirable size for presentation data utilized in a presentation that is to be projected and viewed by persons within a known viewing distance.

2. Description of the Related Art

To convey information at business meetings, conferences, and in educational settings, presentations are often made by projecting transparencies on a screen or by using an LCD projector that takes the presentation from a computer and projects the presentation onto the projection screen. Unfortunately, many times the text in the projected presentation is not readable by members of the viewing audience because it is too small. The audience is left with a deficient experience of the presentation.

Presentation tools are known in the art such as Lotus FreeLance and Microsoft Powerpoint. However, none of the known presentation tools determines when a given size of presentation text may be too small to be viewable by viewers in a room of a given size when the presentation is projected onto a screen. The tools likewise do not warn the creator of the presentation that the current text size is too small, nor do the tools suggest a more desirable font size.

SUMMARY OF THE INVENTION

Various embodiments of the present invention enable a presentation authoring tool to warn a user, while the user is authoring the presentation, that text may be too small to be viewable when the presentation is projected onto a viewing screen of a given size and viewed by an audience a given distance from the projection screen.

Various embodiments of the present invention enable a presentation authoring tool to recommend a font size for text that will be projected onto a viewing screen of a given size at a given distance from an audience.

Various embodiments of the present invention enable a presentation authoring tool to display, on a display screen utilized by a user of the authoring tool, the authored presentation in a font size that is representative of the size of text that will be viewed when projected onto a screen of a given size and viewed by an audience a given distance from the projection screen.

The system, method and program of the invention enables a presentation authoring tool, that is used to create presentation data for later projection, to determine a recommended font size for the created presentation data displayed on a display screen of a computer executing the presentation authoring tool. The user interface presents a display screen for receiving input of an expected viewing distance or room size for the later projection of the presentation. The recommended font size is determined based upon the expected viewing distance of the later projection viewable by a person, having a certain viewing capability, at the expected viewing distance. The expected viewing distance may be a maximum viewing distance or a room depth of a room in which the later projection takes place. The recommended font size is further based upon a size in height of the later projection, a height of the display screen, and a font height for characters on a line of a vision chart corresponding to the certain vision capability. As such, the user interface enables receipt of a size in height of the later projection and the certain vision capability. The number of picture elements per inch of the display screen, the height of the display screen, and the display type are queried from the operating system; or, in other embodiments, provided as input from the user.

Once a recommended font size is determined by the tool, the tool displays the recommended font size to the user. In one embodiment, the tool searches for any text that does not have at least the recommended font size and highlights, or otherwise identifies, the text for the user. The user can then more easily find the text for editing; such as to change the font size to the recommended font size.

The system, method, and program of the invention further enables the presentation authoring program to display the current font size to the user in a way that is representative of how a person would view the projected presentation at the expected viewing distance if the current font size in the presentation were utilized in a projected presentation. The tool utilizes the received input of an expected viewing distance of the later projection having a given projection screen height, and redisplays the presentation data using a second font size on the display screen that is representative of an anticipated appearance of the later projected presentation by a person, having a certain vision capability, at the expected viewing distance.

It should be noted that the present invention is applicable to bit mapped fonts and to scalable vector fonts. Likewise, "text" as used herein may be processed in the computer as character data or as an image. As such, the presentation authoring tool of the present invention is also applicable to determining a minimum size of any image data in a presentation in a same fashion as described herein with reference to determining a minimum font size for text.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

The present invention may be executed in a variety of systems, including a variety of computing systems and electronic devices under a number of different operating systems. In one embodiment of the present invention, the computing system is a portable computing system such as a notebook computer which can be easily moved to a room where a presentation is to be given and connected to a LCD projector. Other embodiments may utilize a desktop computer or workstation. In addition, the computing system may also be, for example, a network computer, a midrange computer, a server system, a mainframe computer, a palmtop computer, a personal digital assistant, a telephony device, or other electronic computing system. Therefore, in general, the present invention is preferably executed in a computer system that is capable of connecting directly, or via a network, to a projector for projecting file content, such as a presentation, from the system to a projection screen.

Figure 1A:
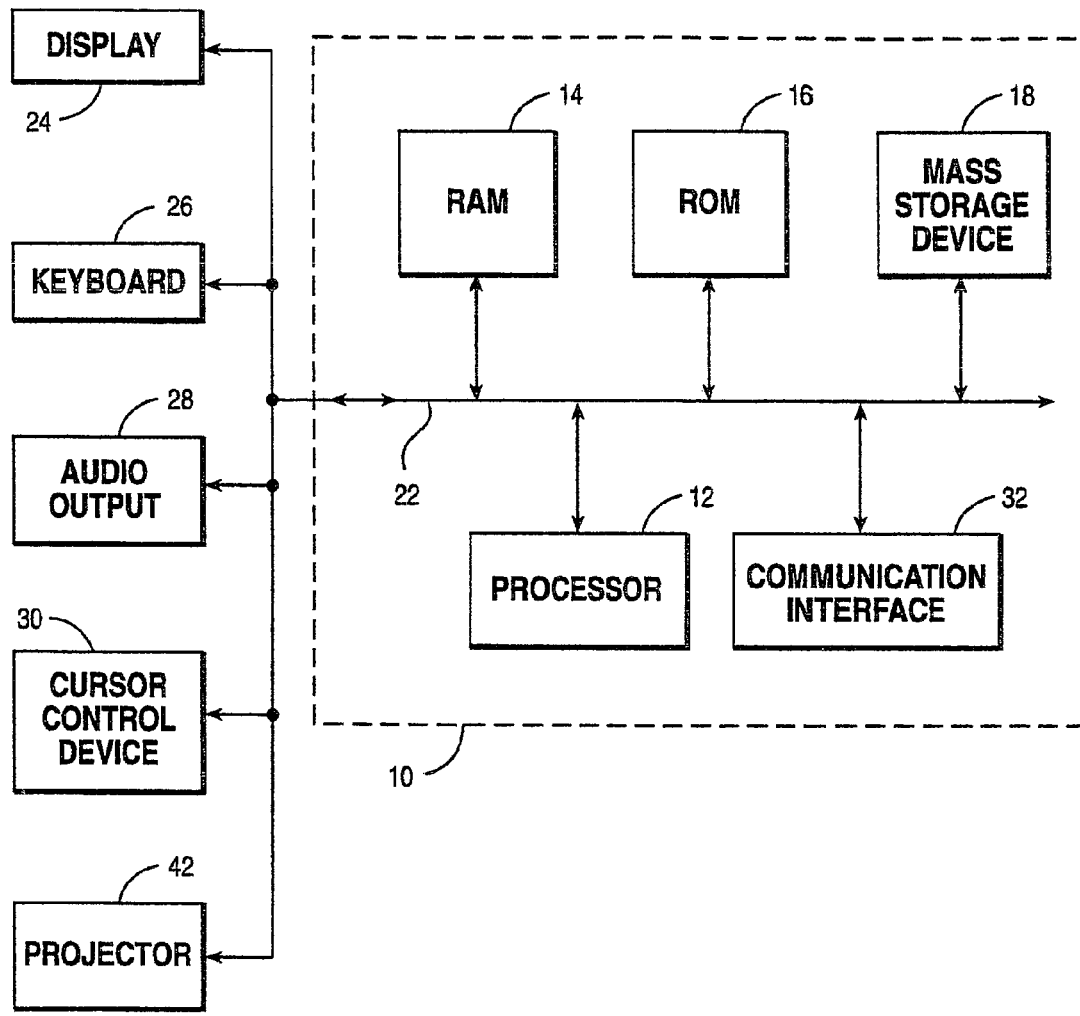
FIG. 1A is a block diagram of a computer system utilized in a preferred embodiment of the invention.

Referring now to the drawings, and in particular to FIG. 1A, there is depicted one embodiment of a computer system with which the method, system, and program of the present invention may be advantageously utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as a random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts described herein. More specifically, the application software is the presentation authoring tool having functional features in accordance with a preferred embodiment of the invention including the feature of determining a recommended font size for the presentation based upon characteristics of the room in which the presentation would be made. Alternatively, the steps of the present invention might be performed by specific hardware components that contain hardwire logic for performing the steps, or by any combination of programmed computer components and custom hardware components.

Further, multiple peripheral components may be added to computer system 10. For example, a display 24 having screen 235 (FIG. 2C) is also attached to bus 22 for providing visual, tactile or other graphical representation formats to a user of the system such as an author using presentation authoring software. A projector 42, such as a LCD projector, is also attached to bus 22 for projecting content from a file onto a projection screen. Audio output through a speaker or other audio projection device may be controlled by audio output device 28 attached to bus 22. A keyboard 26 and cursor control device 30, such as a mouse, track ball, or cursor direction keys, are coupled to bus 22 as interfaces for user inputs to computer system 10. It should be understood that keyboard 26 and cursor control device 30 are examples of multiple types of input devices that may be utilized in the present invention. In alternate embodiments of the present invention, additional input and output peripheral components may be added.

The present invention may be provided as a computer program product, included on a machine-readable medium having stored thereon the machine executable instructions used to program computer system 10 to perform a process according to the present invention. The term "machine-readable-medium" as used herein includes any medium that participates in providing instructions to processor 12 or other components of computer system 10 for execution. Such a medium may take many forms including, but not limited to, nonvolatile media, volatile media, and transmission media. Common forms of nonvolatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of nonvolatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as server to requesting computer system 10 by way of data signals embodied in a carrier wave or other propagation medium via a network link (e.g., a modem or network connection) to a communications interface 32 coupled to bus 22. The signals through the various networks and the signals on the network link and through communications interface 32, which carry the digital or analog data to and from computer system 10, are exemplary forms of carrier waves transporting the information.

Figure 1B:
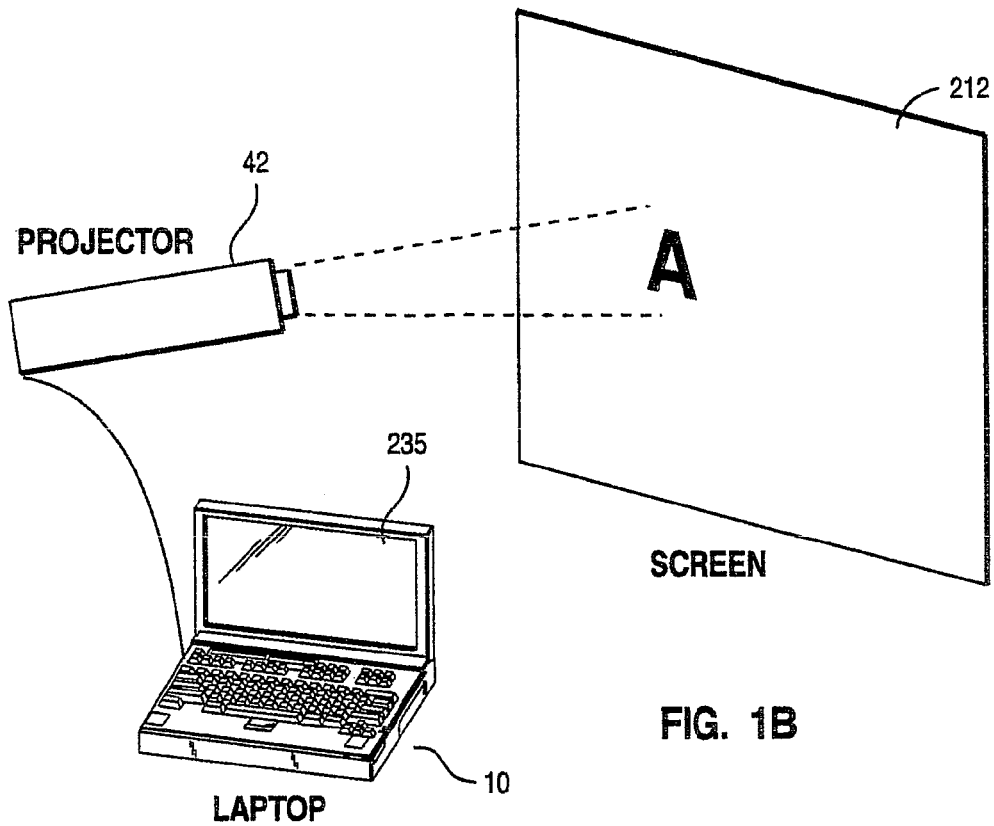
FIG. 1B illustrates a computer system connected to a projector for projecting a presentation onto a projection screen in accordance with a preferred embodiment of the invention.

FIG. 1B illustrates the computer system 10 as a laptop computer connected to an LCD projector 42. The computer 10 has a display screen 235. The presentation being authored by the presentation tool executing on the computer 10 is projected onto projection screen 212.

To determine a minimum desirable size of presentation text for a presentation projected by a presentation authoring tool, the system, method, and program of the invention utilizes information about the presentation environment such as room size, viewing distance, and projection screen size; characteristics of the presentation itself including display screen size; and other standard values with respect to vision measurements.

Figure 2A:
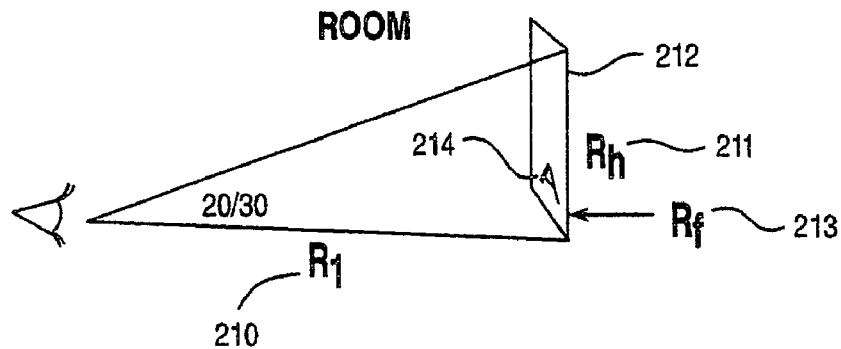
FIG. 2A illustrates the dimensions of a room including the depth of the room, or maximum viewing distance, and the height of a projection screen in the room in accordance with a preferred embodiment of the invention.

The following relationships are used in a preferred embodiment to determine the minimum desirable size of presentation text. The variables used in the relationships with respect to the presentation environment are shown in FIG. 2A as follows:

Rl=maximum viewing distance 210, which is typically the depth of the room;
Rh=height 211 of the presentation screen 212; and
Rf=height 213 of the font 214 on the presentation screen.

It should be noted that although the preferred embodiment of the invention utilizes maximum viewing distance or depth of the room, other embodiments could utilize an average viewing distance or an actual measurement as to the placement of a last or given row of chairs in the audience. Depending on the distance of Rl that is utilized, the resulting determined font size may be an average or minimum recommended font size. It should also be noted that reference to the height 211 of the presentation screen 212, does not necessarily refer to a height of a physical screen, but rather of the height of the illuminated projection area created by the projector regardless of whether the projection is made on a physical screen or a wall.

Figure 2B:
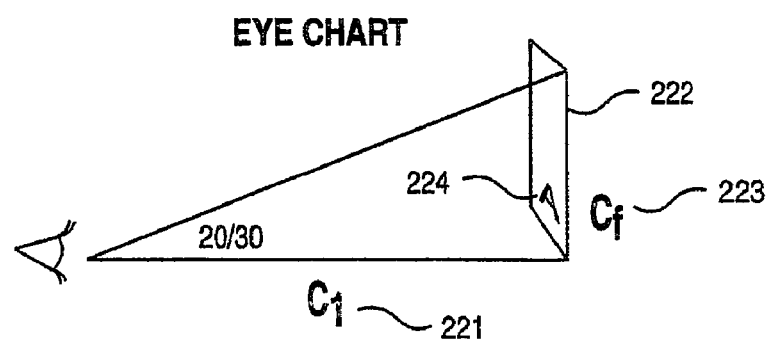
FIG. 2B illustrates the size of a font used in a vision chart and the distance a person stands from the chart when determining the person's vision rating.

The tool also utilizes some constants that are derived from a typical vision chart, as shown in FIG. 2B. Although 20/20 vision is considered perfect vision, not everyone has perfect vision. Even corrected vision may not be perfect. Therefore, a preferred embodiment of the tool utilizes 20/30 as a reasonable threshold, although other embodiments may utilize other thresholds, including 20/20. Other constants from the typical use of eye charts, as shown in FIG. 2B, include:

Cl=distance 221 a subject stands from the eye chart 222; and
Cf=height 223 of the characters 224 on the 20/30 line.

Figure 2C:
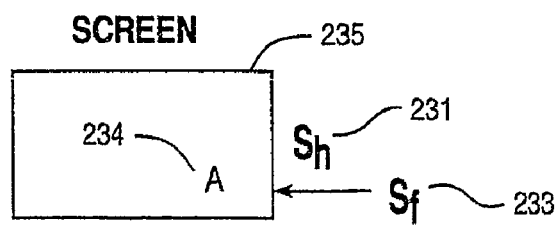
FIG. 2C illustrates the dimensions of a computer screen including the height of the screen and the height of a font displayed on the screen.

The tool of the present invention also utilizes measurements from the computer screen itself on which the presentation tool is being run to present the presentation, as shown in FIG. 2C, including:

Sf=height 233 of the font 234 on the computer screen 235; and
Sh=height 231 of the computer screen 235.

The following formula is used to relate the room proportions to the computer screen proportions:

$$Rh/Sh=Rf/Sf$$

The following formula is used to relate the room proportion to the vision chart:

$$Rl/Cl=Rf/Cf$$

Combining the above two equations through the common variable Rf, the equation becomes:

$$Sf*(Rh/Sh)=Cf*(Rl/Cl)$$

or $$Sf*Rh*Cl=Cf*Rl*Sh$$

Solving for Sf which is the desired font size on the screen to enable a projection of presentation text that is viewable by others in a room having a given viewing distance, the equation becomes:

$$Sf=(Rl*Cf*Sh)/(Cl*Rh)$$

Once the font size on the screen is known in picture elements (pels or pixels), the presentation tool can derive the point size of the font, and recommend the derived point size to the user.

Figure 4:
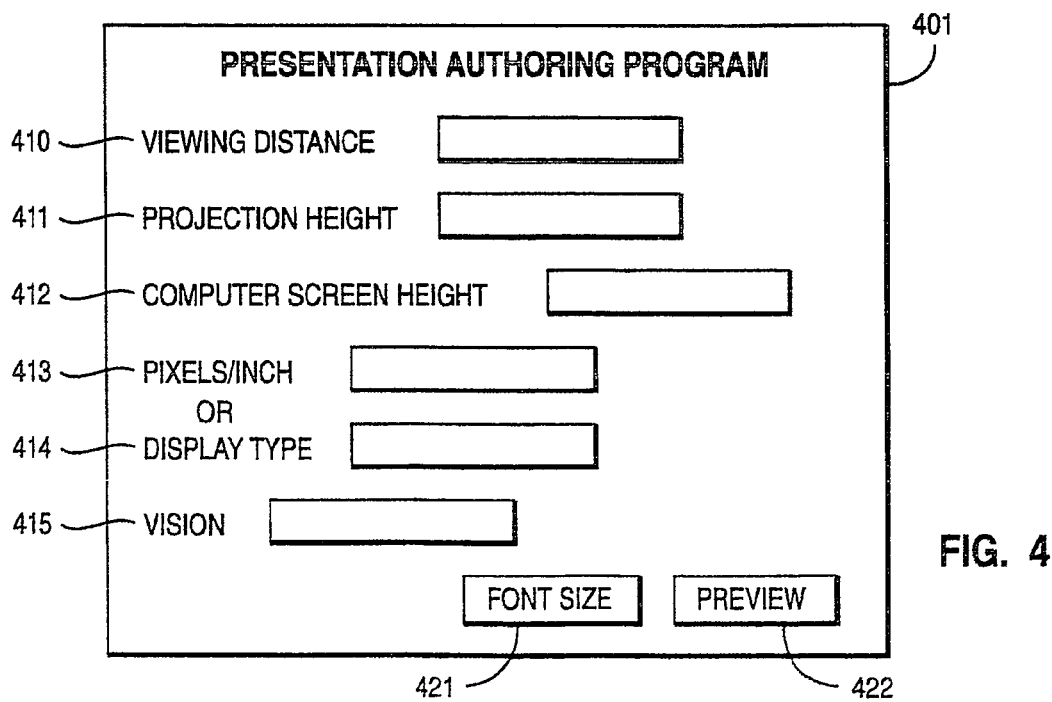
FIG. 4 illustrates a user interface for a presentation authoring tool in accordance with a preferred embodiment of the invention.

For example, if there are 100 pels per inch on a computer display screen, all of the necessary values can be converted accordingly as follows:

Rl=100 ft or 1200 inches or 120,000 pels
Rh=10 ft or 1000 inches or 100,000 pels
Sh=768 pels
Cl=10 feet or 120 inches or 12,000 pels
Cf=1 inch (approx.), 100 pels
Sf=(120,000*100*768)/(100*100,000)
SF=7.68 or about an 8 point font FIG. 4A illustrates a user interface 401 for receiving user input for room depth or maximum viewing distance 410, projection screen height 411, computer screen height 412, picture elements per inch for the display screen 413 or display type 414, and desired vision ability 415. It should be noted that picture elements per inch 413 and display type 414 and computer screen height 412 does not necessarily have to be included in the user interface for user input. Instead, the tool will query the operating system for these values. In yet another embodiment, they are included in the user interface if the user wants to provide input for these values. If input is not provided, then the tool queries the operating system for the values. The user interface also allows the user to select whether the tool is to recommend a font size 421, or show a preview of the presentation using a known font size 422, as further described below.

Figure 3:
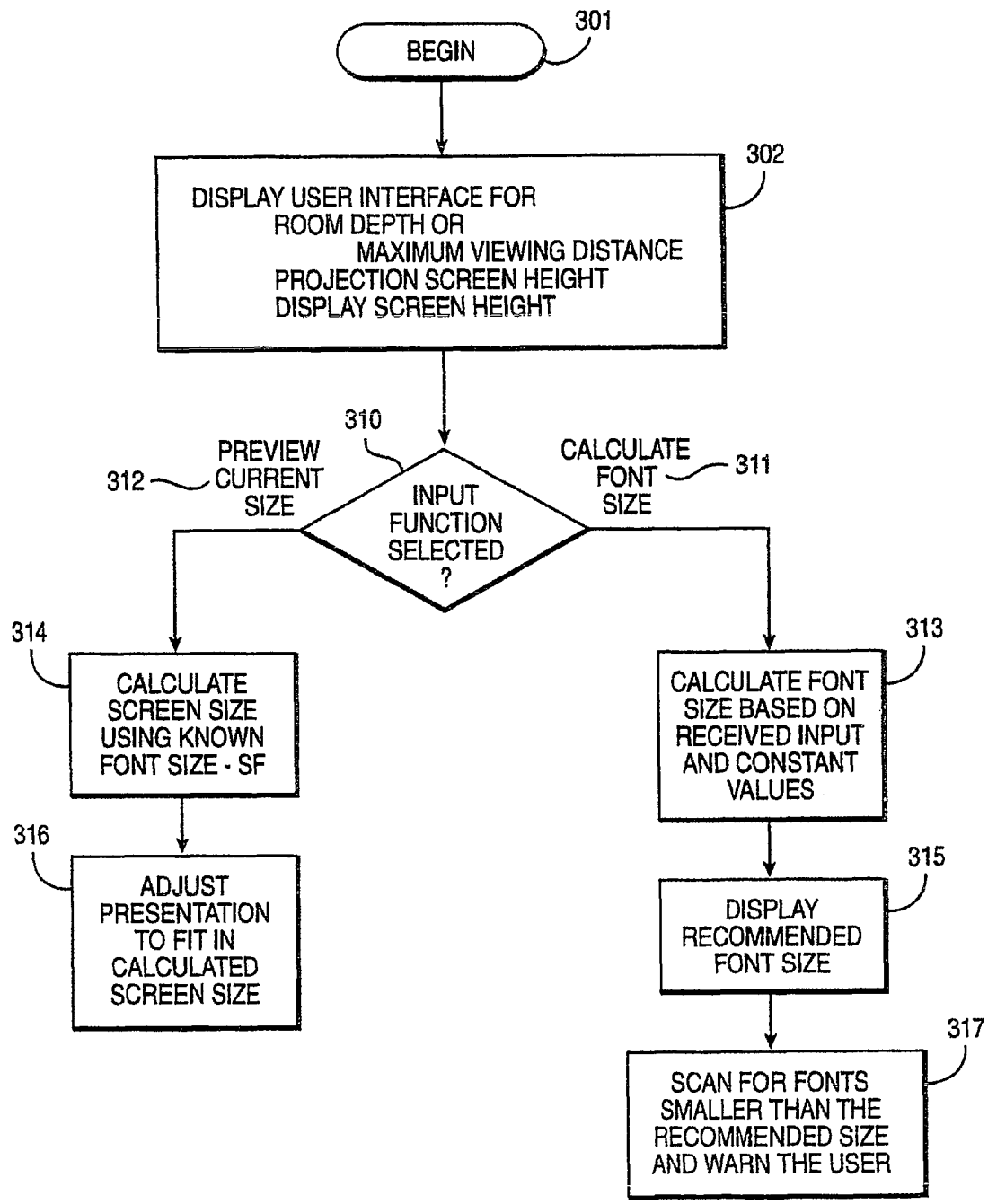
FIG. 3 illustrates a process flow diagram of a presentation authoring tool in accordance with a preferred embodiment of the invention.

FIG. 3 illustrates a process flow diagram of a preferred embodiment of the invention. The process begins when the presentation authoring program is executed and the font size determining feature is selected, 301. In response to the font size determining feature being selected 301, the presentation authoring software presents a user interface to the user for receiving certain input from the user including maximum distance from the projection screen or room depth, height of projection screen, and height of the computer display screen, 302. Other embodiments may also allow the user to specify whether the user wants the resulting size text to be visible to those having 20/20 vision at the maximum viewing distance, or to be clearly visible to those having 20/30 vision, or some other value at the maximum viewing distance. In a preferred embodiment, the default values used enable the resulting projected text to be clearly visible even to those that have no worse than 20/30 vision. Other embodiments may utilize other default values such that the resulting text is clearly visible to those that have no worse than 20/20 vision.

Once the user has input the requested values, the user selects a desired function for the tool to perform. The tool can calculate a recommended font size for the author to utilize when preparing the presentation text on the computer, or the tool can present the current font size to the user in a way that is representative of how a person would view the projected presentation at a maximum viewing distance if the current font size is utilized in the projected presentation, 310.

If the user selects the tool to determine a recommended font size, the tool calculates a recommended font size for the text displayed on the author's display screen, 311. The tool uses the received input values of room depth or maximum viewing distance, the height of the projection screen, and the height of the author's computer display screen. The tool also uses some constant values such as the size of the font on a vision chart and the distance that a person would stand from the vision chart in order to see that sized font if the person had a certain vision as specified by a default value or as received as input, e.g., 20/20, 20/30, 20/40, etc., 313.

In performing the calculation, the presentation authoring program tool running on the author's computer system utilizes certain characteristics of the computer's display screen. This includes not only the screen height as inputted by the user, but also the number of picture elements (pels or pixels) per inch. The tool can get both of these values through input from the user. In another embodiment, one or more of these values are retrieved by the tool by querying the system for the type of display attached to the system. Knowing the display type, the tool can look up the number of picture elements per inch for that display type in a look up table in the tool. Once the tool knows the number of picture elements per inch on the computer display screen, the tool converts the calculated size of the font above in inches to the closest point font. The tool displays the recommended font size to the user, 315.

The tool may also be used to highlight or otherwise identify specific text in a presentation that does not meet the recommended font size. As such, the presentation authoring tool scans the presentation for fonts smaller than the recommended size and warns the user, 317. The user is being warned, while the user is authoring the presentation, that text may be too small to be viewable when the presentation is projected onto a viewing screen of a given size and viewed by an audience a given distance from the projection screen.

Once the presentation authoring tool identifies the text, the user may then more easily edit the identified text thereby changing the identified text to at least the recommended font size. Likewise, upon a selection by the user, the tool may automatically resize any identified undersized text to at least the recommended font size.

The following describes the functions of the tool if the user selects the tool to display the current font size to the user in a way that is representative of how a person would view the projected presentation at a maximum viewing distance if the current font size is utilized in the presentation, 310, 312. The tool utilizes the relationship:

$$Sf*Rh*Cl=Cf*Rl*Sh$$

as described above to solve for a display screen height using the known font size Sf, 314, currently being used in the presentation text:

$$Sh=(Sf*Rh*Cl)/(Cf*Rl)$$

If the font size that is used is actually smaller than the recommended size, the screen height Sh will be smaller, also.

To preview the screen and give the user an approximation of how the text, when projected, would appear to someone in the audience at the maximum viewing distance, the contents of the actual screen are reduced in size proportionally to fit in the newly calculated screen height, 316. In the process of reducing the presentation down to the right proportional height, some information, such as the smaller details, may be lost although the larger objects and text may still be visible. If the actual font size is larger than the minimum recommended size, the tool will proportionally stretch the text and objects of the presentation displayed on the screen to make them larger.

Figure 5A:
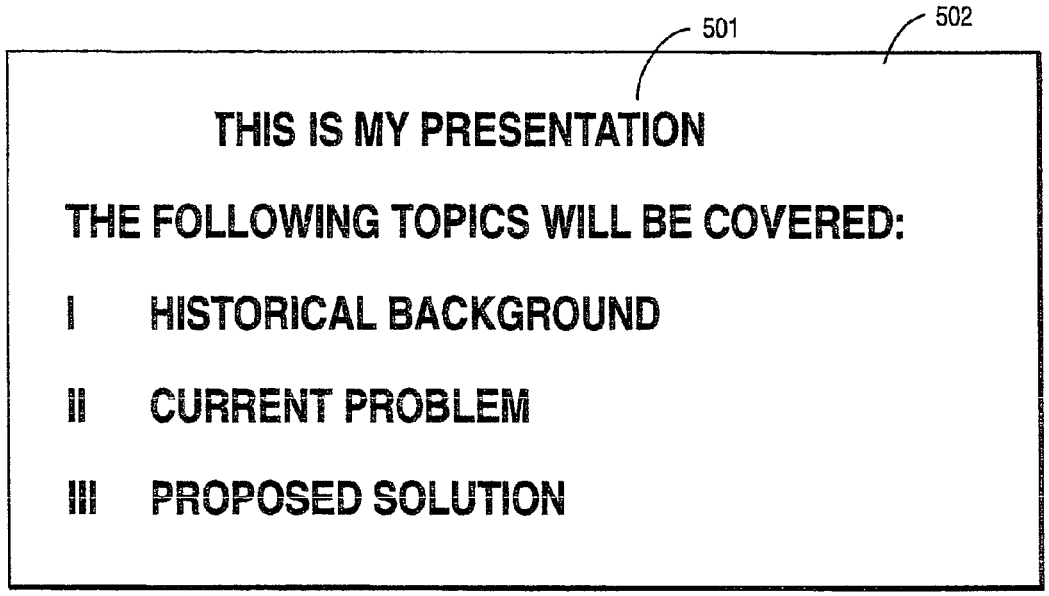
FIG. 5A illustrates a sample presentation having a current given font size.
Figure 5B:
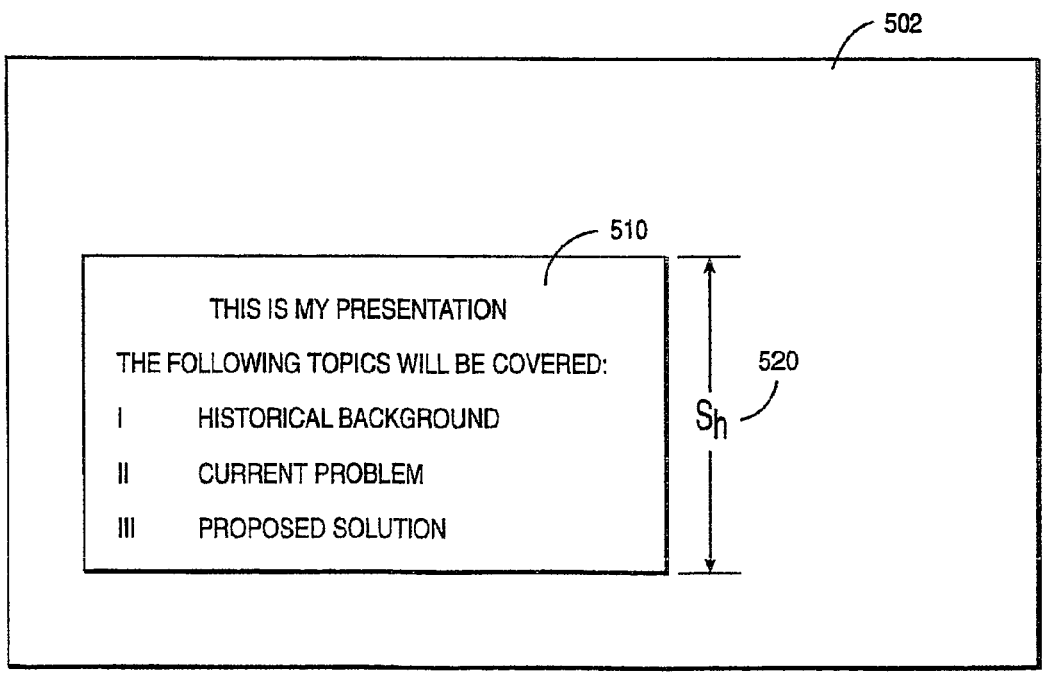
FIG. 5B illustrates a preview provided by the presentation authoring tool in which the current given font size used in the presentation is reduced in size on the display screen of the computer to provide to the author a relative indication as to the readability of the presentation when the presentation is projected onto a projection screen.

FIG. 5A illustrates a sample presentation 501, using a current font size, which is displayed on computer display screen 502. FIG. 5B illustrates a preview of the presentation 510 having a smaller font size displayed on display screen 502. The contents of the actual screen 502 (FIG. 5A) are reduced in size proportionally to fit in the newly calculated screen height Sh, 520. This preview 510 illustrates to the user of the presentation authoring software tool how the presentation with the current font size (as shown in FIG. 5A), within the authoring tool, would appear if the presentation were to be projected with a given screen projection height and viewed at a given maximum viewing distance.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

The invention claimed is:

1. A computer-implemented method for enabling a creation of presentation data for later projection, comprising:
  determining a recommended display size for the created presentation data displayed on a display screen of a computer executing a presentation authoring tool, wherein the determining comprises:
  receiving input of an expected viewing distance for the later projection of the presentation data;
  determining the recommended display size based upon the received input of the expected viewing distance of the later projection, wherein the display size has a projected data size viewable by a person who has a certain vision capability, at the expected viewing distance; and
  the authoring tool indicating, during preparation of a presentation using the authoring tool, which presentation data is currently smaller than the recommended display size.

2. The method of claim 1, wherein the presentation data comprises at least one of text data and image data.

3. The method of claim 1, wherein the presentation includes text data and the size is a font size and wherein said indicating of presentation data that is smaller than the recommended size comprises identifying, by one or more of annotating and highlighting of the text data, that the presentation data is smaller and providing a warning to a user.

4. The method of claim 1, wherein the expected viewing distance is at least one of a maximum viewing distance and a room depth of a room in which the later projection takes place.

5. The method of claim 1, further comprising receiving further input of at least one of a size in height of the later projection, a height of the display screen, a number of picture elements per inch of the display screen, a display type, and the certain vision capability.

6. A method for displaying presentation data on a display screen of a computer executing a presentation authoring tool for enabling a creation of the presentation data, having a current font size, for later projection, the method comprising:
  receiving input for an expected viewing distance of the later projection having a given projection screen height; and
  redisplaying the presentation data using a second font size on the display screen that is representative of an anticipated appearance of the later projection, having a projected font size based upon the current font size, using the given projection screen height, of the presentation data by a person who has a certain vision capability, at the inputted expected viewing distance.

7. The method of claim 6, wherein the redisplaying further comprises determining a new display screen height and adjusting the second font size of the presentation data for the new display screen height.

8. A computer program, on a computer usable storage medium, having program code for enabling a creation of presentation data for later projection, the computer program comprising:
- program code for enabling a determination of a recommended display size for the created presentation data displayed on a display screen of a computer executing a presentation authoring tool, the program code comprising:
  - program code for enabling receipt of input of an expected viewing distance for the later projection of the presentation;
  - program code for enabling a determination of the recommended display size based upon the received input of the expected viewing distance of the later projection having a projected data size viewable by a person who has a certain vision capability at the expected viewing distance; and
  - program code for indicating, during a preparation of a presentation using the authoring tool, which presentation data is currently smaller than the recommended display size.

9. The computer program of claim 8, wherein the presentation data is at least one of text data and image data.

10. The computer program of claim 8, wherein the presentation data includes text data and the size is a font size, and wherein said indicating of presentation data that is smaller than the recommended size comprises identifying, by one or more of annotating and highlighting of the text data, that the presentation data is smaller and providing a warning to a user, and the computer program product further comprises program code for automatically resizing any identified undersized text to at least the recommended font size in response to a user selection.

11. A computer program, on a computer usable medium, having program code for enabling a creation of presentation data, having a current font size, for later projection, the computer program comprising:
- program code for enabling receipt of input for an expected viewing distance of the later projection having a given projection screen height; and
- program code for enabling a redisplaying of the presentation data using a second font size on the display screen that is representative of an anticipated appearance of the later projection, having a projected font size based upon the current font size, using the given projection screen height, of the presentation data by a person who has a certain vision capability, at the inputted expected viewing distance.

12. The computer program of claim 11, wherein the program code for enabling the redisplaying further comprises program code for enabling a determination of a new display screen height and adjusting the second font size of the presentation data for the new display screen height.

13. A computer system having a processor for executing a presentation authoring program, stored in memory, for enabling a creation of presentation data for later projection, the computer system comprising:
- program instructions executable on the processor for determining a recommended display size for the created presentation data displayed on a display screen of the computer, said program instructions comprising:
  - instructions for receiving input of an expected viewing distance for the later projection of the presentation;
  - instructions for determining the recommended display size based upon the received input of the expected viewing distance of the later projection having a projected data size viewable by a person who has a certain vision capability, at the expected viewing distance; and
  - instructions for indicating, during a preparation of a presentation, which presentation data is currently smaller than the recommended display size.

14. The computer system of claim 13, wherein the presentation data is at least one of text data and image data.

15. The computer system of claim 13, wherein the expected viewing distance is at least one of a maximum viewing distance and a room depth of a room in which the later projection takes place.

16. The computer system of claim 13, wherein the presentation data includes text data and the size is a font size, and wherein said indicating of presentation data that is smaller than the recommended size comprises identifying, by one or more of annotating and highlighting of the text data, that the presentation data is smaller and providing a warning to a user, and said computer system further comprises program instructions for automatically resizing any identified undersized text to at least the recommended font size in response to a user selection.

17. The computer system of claim 13, further comprising program instructions for receiving further input of at least one of a size in height of the later projection, a height of the display screen, a number of picture elements per inch of the display screen, a display type, and the certain vision capability.

18. A computer system having a processor for executing a presentation authoring tool, stored in memory, for enabling a creation of presentation data, having a current font size, for later projection, the computer system comprising:
- program instructions for receiving input for an expected viewing distance of the later projection having a given projection screen height; and
- program instructions for redisplaying the presentation data, on a display screen of the computer, using a second font size on the display screen that is representative of an anticipated appearance of the later projection, having a projected font size based upon the current font size, using the given projection screen height of the presentation data by a person who has a certain vision capability, at the received expected viewing distance.

19. The computer system of claim 18, wherein the presentation data includes text data and the size is a font size.

20. The method of claim 3, further comprising automatically resizing any identified undersized text to at least the recommended font size in response to a user selection.

* * * * *